they

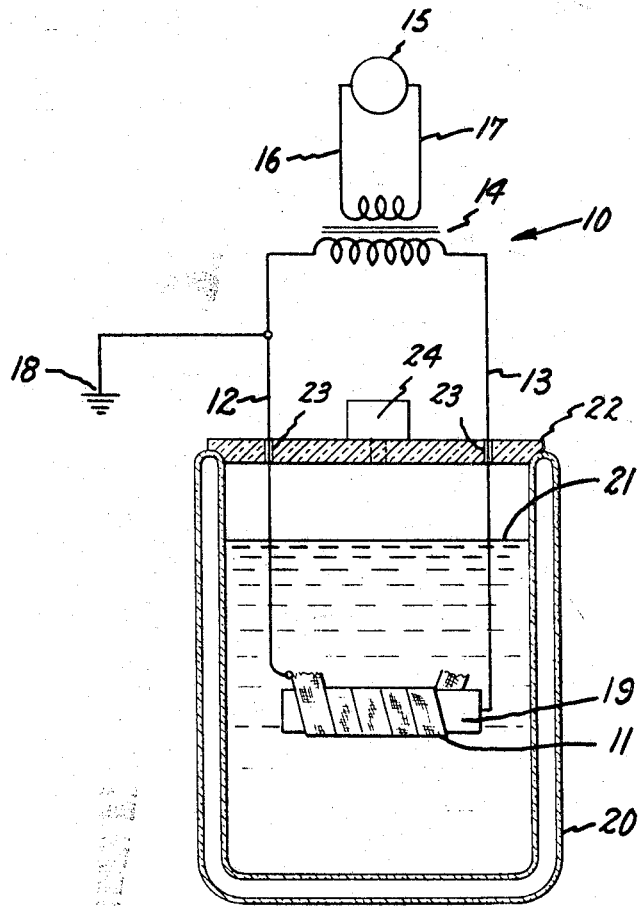

United States Patent Office 3,466,378
Patented Sept. 9, 1969

3,466,378
ELECTRICAL INSULATION AND METHOD OF TREATMENT
Kenneth N. Mathes, Schenectady, N.Y., assignor to General Electric Company, a corporation of New York
Filed Aug. 24, 1966, Ser. No. 574,659
Int. Cl. H01b 9/06, 7/34
U.S. Cl. 174—15                                         12 Claims

ABSTRACT OF THE DISCLOSURE

A method is described for forming a stable porous, fibrous, electrical insulation which comprises impregnating the insulation with liquid hydrogen thereby decreasing its dissipation factor with time, and maintaining the insulation in liquid hydrogen. A stable electrical insulation is described which comprises such insulation impregnated with liquid hydrogen, and immersed in liquid hydrogen. A stable insulated conductor is also described which has the above type of insulation impregnated with liquid hydrogen, and immersed in liquid hydrogen.

---

This application relates to electrical insulation and to methods of treating such insulation and, more particularly, to improved porous, fibrous, electrical insulation and to methods of treating such insulation whereby its electrical loss is decreased and strength is increased when operated at cryogenic temperatures in liquid hydrogen.

Electrical insulation, which can be employed in a cryogenic environment, is useful for a wide variety of applications, including superconductive magnets, switching elements, generators, motors, capacitors, cables and transformers. In such applications, it is necessary that the electrical insulation provide stability and that its associated electrical conductor exhibit good electrical strength at cryogenic operating temperatures. In an article entitled "Electrical Insulation at Cryogenic Temperatures," by K. N. Mathes, in the September 1963 issue of "Electro-Technology," on pages 72–77, there is described certain effects upon specific electrical insulations at particular cryogenic temperatures.

My invention is directed to improved electrical insulation, insulated conductors formed therefrom, and to methods for providing such improved insulation for employment at liquid hydrogen temperatures. Porous, fibrous, electrical insulation comprises a wide variety of materials, particularly papers, mats, films and laminates. For example, suitable porous, fibrous, electrical insulation includes rag paper, cable paper, asbestos paper, acetylated paper, cyanoethylation paper, and similarly modified papers, glass mat, unwoven Dacron resins, polyvinyl alcohol films, and laminates of these materials with films such as Mylar film or polyimides.

It is an object of my invention to provide improved electrical insulation which will exhibit dielectric stability at cryogenic temperatures of liquid hydrogen.

It is another object of my invention to provide an insulated conductor with such improved insulation covering at least a portion thereof, thereby exhibiting improved electrical strength at the above low temperature conditions.

It is a further object of my invention to provide an improved method of treating porous, fibrous, electrical insulation, whereby it will exhibit stability under the above conditions.

In accordance with my invention, an improved electrical insulation is produced which consists of porous, fibrous, electrical insulation impregnated with liquid hydrogen, or impregnated with a dielectrically polar liquid and liquid hydrogen.

These and various other objects, features and advantages of the invention will be understood from the following description taken in connection with the accompanying drawing.

When porous, fibrous, electrical insulation, in the form of conventional cellulosic cable paper, is used for high voltage application at and above room temperature, it is vacuum impregnated initially in a dielectric liquid, such as oil, to provide high voltage capability. A common procedure to estimate and compare such capability or life expectancy is to measure the dissipation factor as a function of time at various voltages. Instability is indicated at a particular temperature if the dissipation factor tends to increase as a function of time.

The above cable paper was also subjected to a liquid nitrogen environment. Measurements were made of dissipation factor as a function of time. While lower values of dissipation factor were obtained at various voltages, the stability was very similar to the performance of such insulation immersed in a dielectric oil and measured at or above room temperature.

I discovered unexpectedly that porous, fibrous, electrical insulation exhibited improved stability by impregnating such insulation with liquid hydrogen, thereby producing a good cryogenic dielectric. I found a completely unexpected decrease in dissipation factor with time, which occurred at various voltages at which conventional cable paper impregnated with oil and such cable paper treated in boiling liquid nitrogen exhibited increases in dissipation factor and subsequently failed. I found also that I obtained an unexpected decrease in dissipation factor with time at voltages well above those for which instability is indicated for either the oil impregnated or liquid nitrogen impregnated cable paper. This decrease in dissipation factor with time leads to dielectric stability of the insulation at cryogenic temperatures of liquid hydrogen, which is the exact reverse at normal temperatures in conventional dielectric liquids or in liquid nitrogen.

Additionally, I found that the stability of such insulation at cryogenic temperatures of liquid hydrogen was increased further for porous, fibrous, electrical insulation by impregnating the insulation with both a dielectrically polar liquid and liquid hydrogen. I found that I could immerse the porous, fibrous insulation in a dielectrically polar liquid such as water, propylene oxide, formaldehyde, formamide, ethyl acrylate or ethyl bromide, and subsequently impregnate the insulation with liquid hydrogen for employment at liquid hydrogen temperatures.

In the single figure of the drawing, there is shown apparatus 10 for measuring the dissipation factor as a function of time at various voltages for electrical insulation. The tests for high voltage, dielectric loss were carried out in accordance with the provisions of the American Society of Testing Materials Standard D–150. Instability is indicated at a particular temperature if the dissipation factor tends to increase as a function of time.

Apparatus 10 comprises a braid electrode 11 with a lead 12 attached to one end of the electrode and a second lead 13 adapted to be attached to the electrical insulation to be tested in the apparatus. These leads 12 and 13 are connected to the terminals of a transformer 14. A variac 15 is connected by a pair of leads 16 and 17 to the other terminals of transformer 14. A ground 18 is also provided from lead 12. A power source (not shown) is provided for variac 15, whereby the voltage is varied across the electrical insulation to be tested. Such insulation, which is shown generally at 19, is in the form of a stainless steel tube with four layers of porous, fibrous, electrical insulation wrapped therearound. Lead 13 is connected to insulation 19, while lead 12 is connected to one end of electrode 11.

The apparatus is further shown in the single figure of the drawing as capable of testing electrical insulation at cryogenic temperatures by including an insulated container 20, which is filled with a cryogenic liquid 21. A cover 22, which is provided for container 20, has apertures 23 therethrough for leads 12 and 13, and a vent 24.

A stainless steel cylindrical tube was wrapped with four layers of 0.005 inch cellulosic cable paper having a density of 0.9. This porous, fibrous, electrical insulation, which had been previously vacuum impregnated with a dielectric oil, had a copper braid electrode wrapped around its exterior surface. One end of the electrode was connected to one lead, while the other was connected to the insulation. The temperature was 23° C. when the power was turned on and the variac was adjusted to provide an average voltage stress of 600 volts per mil. Within five minutes, the insulation showed signs of instability based upon an increasing dissipation factor with time. At 725 volts per mil, the insulation failed. These results are shown below in Table I.

The same apparatus was employed again, including a container filled with liquid nitrogen. Cellulosic cable paper with a 0.9 density, which was not impregnated with oil, was wrapped in a copper braid electrode and immersed in the liquid nitrogen. The above procedure was followed to determine the dissipation factor as a function of time. While lower values of dissipation factor were obtained at various voltages, the stability was very similar to the performance of the above insulation, which had been vacuum impregnated with a dielectric oil. These results are shown below in Table I.

TABLE I.—DISSIPATION FACTOR VERSUS TIME

| | | Dissipation Factor—tan $s$ | |
|---|---|---|---|
| Avg. Voltage Stress, volts/mil | Time (minutes) After Application of Voltage | Oil Impregnated Paper at 23° C. | Paper in Boiling Liquid Nitrogen, −196° C. |
| 250 | 1 | | |
| | 5 | | |
| | 10 | | |
| 375 | 1 | | |
| | 5 | | |
| 600 | 1 | .0080 | |
| | 5 | .00815 | |
| | 10 | .0084 | |
| | 15 | .0086 | |
| 725 | 1 | .014 | |
| | 2 | [1] .018 | |
| 750 | 1 | (¹) | |
| | 5 | | |
| | 10 | | |
| | 15 | | |
| 900 | 1 | | |
| | 5 | | |
| | 10 | | |
| | 15 | | |

¹ Failed.

The same apparatus, including the container, was employed, but boiling liquid hydrogen was put in the container. Cellulosic cable paper with a 0.9 density, which had not been vacuum impregnated with oil, was wrapped in a copper braid electrode and immersed in the liquid hydrogen, thereby impregnating the paper insulation. The insulated conductor comprised an electrical conductor in the form of the stainless steel cylinder with porous, fibrous, electrical insulation covering the exterior surface of the conductor, which insulation was impregnated with liquid hydrogen. The above procedure was then followed to determine the dissipation factor as a function of time. Unexpectedly, this insulation exhibited improved stability in that even at 900 volts per mil, the dissipation factor decreased with time. The insulated conductor showed improved electrical strength at this low temperature. These results are shown in Table II below.

The above apparatus was used again. However, 0.7 density cellulosic cable paper was used. After impregnation in liquid hydrogen, this paper at lower voltage stresses gave some indication of stability. However, at higher voltage stresses, the higher density paper of 0.9 is much superior. The results are shown below in Table II.

TABLE II.—DISSIPATION FACTOR VERSUS TIME

| | | Dissipation Factor—tan $s$, Paper in Boiling Liquid Hydrogen, −253° C. | |
|---|---|---|---|
| Avg. Voltage Stress, volts/mil | Time (minutes) After Application of Voltage | Paper 0.9 Density | Paper 0.7 Density |
| 250 | 1 | <0.0003 | 0.00068 |
| | 5 | <0.0003 | 0.00065 |
| | 10 | <0.0003 | 0.00060 |
| 375 | 1 | <0.0003 | 0.00130 |
| | 5 | <0.0003 | 0.00117 |
| 600 | 1 | <0.0003 | |
| | 5 | <0.0003 | |
| | 10 | <0.0003 | |
| 725 | 1 | | |
| | 2 | | |
| 750 | 1 | 0.00086 | 0.0017 |
| | 5 | 0.00075 | 0.0018 |
| | 10 | 0.00055 | 0.0018 |
| | 15 | 0.00055 | 0.0018 |
| 900 | 1 | 0.010 | |
| | 5 | 0.0050 | |
| | 10 | 0.0031 | |
| | 15 | 0.0025 | |

The same apparatus was employed again, including the container filled with boiling liquid hydrogen. Acetylated paper was used which was wrapped in a copper braid electrode and immersed in the liquid hydrogen, thereby impregnating the paper. The same procedure was followed to determine the dissipation factor as a function of time. Average voltage stresses were applied from 912 to 1180 volts. This insulation impregnated with liquid hydrogen exhibited the unexpected decrease of dissipation factor as a function of time.

TABLE III.—DISSIPATION FACTOR VERSUS TIME

| | | Dissipation Factor—tan $s$, Paper in Boiling Liquid Hydrogen, −253° C. | |
|---|---|---|---|
| Avg. Voltage Stress, volts/mil | Time (minutes) After Application of Voltage | Paper 0.9 Density | Acetylated |
| 900 | 1 | .010 | |
| | 5 | .0050 | |
| | 10 | .0031 | |
| | 15 | .0025 | |
| 912 | 1 | | .00022 |
| | 2 | | .00020 |
| | 8½ | | .00020 |
| 1,090 | ¹ 10 | | .00065 |
| | 2½ | | .00059 |
| | 10 | | .00057 |
| | 15½ | | .00056 |
| | 60 | | .00053 |
| | 130 | | .00054 |
| | 174 | | .00051 |
| | 240 | | .00049 |
| | 270 | | .00046 |
| 1,180 | ½ | | .00066 |
| | 2 | | .00063 |
| | 12 | | .00060 |

¹ Seconds.

The above results, which are set forth in Tables I, II and III, were obtained with insulation which represents the rather uniform voltage stress distribution obtained in cable construction. In many other applications, such as transformers and particularly capacitors, sharp concentrations of voltage stress are to be expected. The unexpected results, which are set forth above, for more uniform fields and shown in the above tables, are applicable also for nonuniform voltage fields as are set forth below in Table IV. The apparatus and procedures as set forth above were used with a capacitor type specimen, whereby there was a sharp concentration of voltage stress at the edges of the electrode. It is seen that instability in oil occurs at lower voltage, but the decrease of dissipation factor with time is found again unexpectedly when the insulation has been impregnated with liquid hydrogen.

TABLE IV.—DISSIPATION FACTOR VERSUS TIME

| Avg. Voltage Stress, volts/mil | Time (minutes) After Application of Voltage | Dissipation Factor—tan $s$ | |
|---|---|---|---|
| | | Oil Impregnated Paper at 23° C. | Paper in Boiling Liquid Hydrogen −253° C. |
| 467 | 1 | .0056 | .00132 |
| | 5 | .0058 | .00118 |
| | 10 | .0058 | .00115 |
| 533 | 1 | .01 | .0088 |
| | 5 | .0125 | .0065 |
| | 10 | .029 | .0055 |
| | 15 | .047 | .0051 |
| 600 | 1 | .086 | .0195 |
| | 5 | (¹) | .018 |
| | 10 | (¹) | .016 |
| | 15 | (¹) | .015 |
| | 30 | (¹) | .0125 |

¹ Failed.

The stability of above insulation is further increased at cryogenic temperatures of liquid hydrogen by impregnating the porous, fibrous, electrical insulation with both a dielectrically polar liquid and liquid hydrogen. Four layers of 0.005 inch cellulosic cable paper having a density of 0.9 was wrapped around a stainless steel cylindrical tube. The paper insulation was then contacted with or immersed in a dielectrically polar liquid to impregnate the insulation therewith. A copper braid electrode was then wrapped around the insulation which was then impregnated by liquid hydrogen by being immersed therein. The above apparatus and procedures were then used to determine the dissipation factor as a function of time. These results, which are shown below in Table V were obtained by the uniform application of a voltage stress of 900 volts per mil in both boiling and liquid hydrogen.

TABLE V.—DISSIPATION FACTOR VERSUS TIME

| Condition of Paper (at 23° C.) | Boiling Liquid, −253° C. | | | Freezing Liquid, −259° C. | | |
|---|---|---|---|---|---|---|
| | 1 min. | 5 min. | 10 min. | 1 min. | 5 min. | 10 min. |
| Dried | .013 | .0076 | .0055 | | | |
| 50% RH | .0098 | .0047 | .0030 | .00105 | .0011 | .0007 |
| 100% RH | .00135 | .00070 | .00060 | .00080 | .00033 | .00029 |
| Impregnated with Propylene Oxide | .00076 | .00055 | .00035 | | | |

Table VI sets forth the results of short time electrical strength tests on ¼ and ½ inch disc electrodes with 0.9 density cellulosic cable paper on one surface thereof in boiling liquid hydrogen. While both water and formamide give substantial increases in voltage breakdown, propylene oxide excels both of these first impregnants.

TABLE VI.—ELECTRIC STRENGTH

| First Impregnant | Layers | Average Thickness, Mils | Volts per Mil Thickness | | |
|---|---|---|---|---|---|
| | | | Avg. | Max. | Min. |
| None | 1 | 5.35 | 1,450 | 1,490 | 1,380 |
| Water | 1 | 8.5 | 2,070 | 2,140 | 2,000 |
| Propylene Oxide | 1 | 5.4 | 4,230 | 4,280 | 4,080 |
| Formamide | 1 | 11.0 | 2,410 | 2,550 | 2,260 |

I claim:
1. A dielectrically stable insulated conductor comprising at least one electrical conductor; porous, fibrous, electrical insulation covering at least a portion of said conductor; the insulation impregnated with a dielectrically polar liquid and with liquid hydrogen; and the conductor immersed in liquid hydrogen.
2. A product as in claim 1, in which the polar liquid is propylene oxide.
3. A product as in claim 1, in which the polar liquid is water.
4. A product as in claim 1, in which the polar liquid is formamide.
5. A dielectrically stable electical insulation which comprises porous, fibrous, electrical insulation impregnated with a dielectrically polar liquid and with liquid hydrogen, and immersed in liquid hydrogen.
6. A product as in claim 5, in which the polar liquid is propylene oxide.
7. A product as in claim 5, in which the polar liquid is water.
8. A product as in claim 5, in which the polar liquid is formamide.
9. A method of forming a dielectrically stable porous, fibrous, electrical insulation which comprises impregnating said insulation with a dielectrically polar liquid, and impregnating subsequently said insulation with liquid hydrogen thereby decreasing its dissipation factor with time, and maintaining the insulation in liquid hydrogen.
10. A method in accordance with claim 9, wherein the polar liquid is propylene oxide.
11. A method in accordance with claim 9, wherein the polar liquid is water.
12. A method in accordance with claim 9, wherein the polar liquid is formamide.

References Cited

UNITED STATES PATENTS 3,163,832 12/1964 Nahman et al. ____ 174—110 X
3,396,355 8/1968 Hochart et al.

OTHER REFERENCES

Mathes, K. N.: Electrical Insulation of Cryogenic Temperatures, in Electro-Technology, September 1963, pages 72–77.

ALFRED L. LEAVITT, Primary Examiner

C. K. WEIFFENBACH, Assistant Examiner

U.S. Cl. X.R.

117—99, 98, 128, 231; 174—25; 335—216